United States Patent
Winter et al.

(10) Patent No.: US 9,944,503 B2
(45) Date of Patent: Apr. 17, 2018

(54) SYSTEM AND METHOD FOR TRANSPORTING AND TESTING A CRANE INTENDED FOR USE IN AN OFFSHORE WIND TURBINE

(71) Applicant: SENVION SE, Hamburg (DE)

(72) Inventors: Martin Winter, Bremen (DE); Patrick Friebe, Hamburg (DE); Daniel Reinhardt, Hamburg (DE); Jens Nielsen, Bremen (DE); Ronny Obermüller, Güstrow (DE)

(73) Assignee: SENVION SE, Hamburg (DE)

( * ) Notice: Subject to any disclaimer, the term of this patent is extended or adjusted under 35 U.S.C. 154(b) by 72 days.

(21) Appl. No.: 14/778,723

(22) PCT Filed: Mar. 4, 2014

(86) PCT No.: PCT/EP2014/054159
§ 371 (c)(1),
(2) Date: Sep. 21, 2015

(87) PCT Pub. No.: WO2014/146898
PCT Pub. Date: Sep. 25, 2014

(65) Prior Publication Data
US 2016/0052754 A1    Feb. 25, 2016

(30) Foreign Application Priority Data
Mar. 21, 2013   (DE) .................. 10 2013 205 030

(51) Int. Cl.
*B66C 23/62*   (2006.01)
*B66C 23/74*   (2006.01)
(Continued)

(52) U.S. Cl.
CPC ............ *B66C 23/62* (2013.01); *B66C 23/207* (2013.01); *B66C 23/365* (2013.01); *B66C 23/74* (2013.01); *G01M 99/007* (2013.01)

(58) Field of Classification Search
CPC ...................................................... B66C 23/62
(Continued)

(56) References Cited

U.S. PATENT DOCUMENTS 5,445,032 A * 8/1995 Dixon ................ B66C 15/00
73/788

FOREIGN PATENT DOCUMENTS

| EP | 2383219 A2 | 11/2011 |
| GB | 2487230 A | 7/2012 |
| WO | 2012039889 A1 | 3/2012 |

OTHER PUBLICATIONS

International Search Report dated May 12, 2014 (PCT/EP2014/054159).

* cited by examiner

*Primary Examiner* — Harshad R Patel
*Assistant Examiner* — Jamel Williams
(74) *Attorney, Agent, or Firm* — Alix, Yale & Ristas, LLP

(57) ABSTRACT

A system for transporting and testing a crane includes a crane, a transporting frame and a foundation. A first connecting mechanism is provided for establishing a releasable connection between the crane and the transporting frame. A second connecting mechanism is provided for establishing a releasable connection between the transporting frame and the foundation. In a starting state, the crane, the transporting frame and the foundation are separate from one another. In a transporting state, the crane is connected to the transporting frame. In a testing state, the crane is connected to the transporting frame and the transporting frame is connected (Continued)

to the foundation. The invention also relates to a corresponding method. The invention makes it possible for the crane to be assembled, and tested, at a site remote from an offshore wind turbine.

13 Claims, 4 Drawing Sheets

(51) Int. Cl.
  *B66C 23/20* (2006.01)
  *B66C 23/36* (2006.01)
  *G01M 99/00* (2011.01)
(58) Field of Classification Search
  USPC .................................................... 73/862.56
  See application file for complete search history.

SYSTEM AND METHOD FOR TRANSPORTING AND TESTING A CRANE INTENDED FOR USE IN AN OFFSHORE WIND TURBINE

BACKGROUND

The invention relates to a system and a method for transporting and testing a crane intended for use in an offshore wind turbine.

Offshore wind turbines are often equipped with a crane which is disposed on a working platform at the foundation of the tower. The crane serves for picking up comparatively small loads up to a weight of a few tons, for example, from a ship and for lifting them onto the working platform.

When the offshore wind turbine is erected, the crane to date is shipped in individual parts to the site of the wind turbine and is assembled there. Testing of the crane, comprising a functional test, a load test, and an overload test, is subsequently performed. Assembly and testing of the crane in this manner is time-consuming and compromises the procedure of erecting the offshore wind turbine.

SUMMARY

The invention is founded on the object of proposing a method and a system by way of which time and costs may be saved when erecting a wind turbine. Proceeding from the mentioned prior art, the object is achieved by the features of the independent claims. Advantageous embodiments are to be found in the dependent claims.

The system according to the invention comprises a crane, a shipping frame, and a foundation. A first connection mechanism for establishing a releasable connection between the crane and the shipping frame, and a second connection mechanism for establishing a releasable connection between the shipping frame and the foundation are provided. The system may assume an initial state, a shipping state, and a testing state. In the initial state, the crane, the shipping frame, and the foundation are provided so as to be separate from one another. In the initial state, the crane may be provided so as to be in individual parts or assembled. In the shipping state, the crane is connected to the shipping frame. In the testing state, the crane is connected to the shipping frame, and the shipping frame is connected to the foundation.

The invention makes it possible for the crane to be assembled and tested at a site which is remote from the wind turbine. This may be performed in the port area, for example, where the components of the wind turbine are loaded for shipment to the site of the offshore wind turbine. At said port area, the crane may be assembled from the individual parts without time pressure and without distraction, for example by waves, such that the crane in the already functional state is connected to the shipping frame by way of the first connection mechanism (shipping state). However, the crane on the shipping frame is not sufficiently stable for load tests and overload tests to be possible. The system is put into the testing state in which a connection between the shipping frame and the foundation is established by way of the second connection mechanism. By way of the foundation, the crane is erected so as to be sufficiently stable for load tests and overload tests to be possible. The foundation is distinguished by being able to absorb the loads which arise during testing. The term is not to be understood as limiting in terms of construction. The foundation may be a concrete construction which has been embedded into the ground. Anchoring points which are already available, for example in the form of rails which are embedded in the ground and which are often to be found in the port area, may also be used. Another possibility is a framework which is mounted on the ground and is sufficiently stable. Since the crane has already been assembled and tested, setting-up thereof at the wind turbine now requires only little effort.

The crane may comprise a connector flange by way of which the crane is fastened to the working platform of the wind turbine. Preferably, the shipping frame is equipped with a counterpiece to the connector flange, such that the crane may be connected to the shipping frame by way of the connector flange. The connector flange and the counterpiece together form the first connection mechanism. Preferably, the first connection mechanism is designed such that it is stable in relation to forces from all directions. For example, the first connection mechanism may have bolts which pass through bores in the connector flange, so as to tension the connector flange in relation to the counterpiece.

The counterpiece which is assigned to the shipping frame may be configured on an adaptor part. The adaptor part comprises a connector for connecting to the structure of the shipping frame, and the counterpiece for the connector flange of the crane. If and when the counterpiece is configured on an adaptor part, the shipping frame may be used for various types of cranes by simply exchanging the adaptor part. Preferably, the system according to the invention comprises a set of adaptor parts, wherein the adaptor parts have various counterpieces for connecting to various types of cranes.

During the load tests and overload tests which are performed when the crane and the shipping frame are connected to the foundation, defined forces of known direction and size act on the system. The second connection mechanism, by way of which the shipping frame is connected to the foundation, is stable in relation to these forces. The second connection mechanism may be designed such that it is released when a force from another direction acts between the shipping frame and the foundation. The forces which arise during testing of the crane are typically such forces which act downward or which exert a moment of tilt on the foundation. The second connection mechanism may be conceived such that it is released when a force which is substantially oriented upward acts on the shipping frame. Moreover, the second connection mechanism may be conceived such that it is automatically locked when the shipping frame is placed onto the foundation from above.

For example, the second connection mechanism may comprise a retaining opening and a retaining protrusion which matches the retaining opening. The retaining opening may have a back tapering which in the testing state is engaged from behind by the retaining protrusion. This type of connection mechanism is known from containers which are loaded onto ships and are locked in place there. In a semi-automatic form in which locking is automatically performed in the event of placement, while a manual actuation is necessary for unlocking, the locking mechanism is referred to as a twist lock. In an automatic form in which both locking in the event of placement as well as unlocking in the event of lifting is performed, the locking mechanism is referred to as a quick tie.

The second connection mechanism may comprise a plurality of retaining openings, wherein preferably at least four retaining openings are provided. The four retaining openings may be disposed such that they form the corners of an imaginary rectangle. The connector flange of the crane in the testing state may be disposed within the rectangle. Further-more preferably, the four retaining openings form the corners of an imaginary square, and the connector flange is centrically disposed between the retaining openings. The second connection mechanism may be designed such that the retaining protrusions are disposed on the shipping frame and the retaining openings on the foundation. The reversed arrangement, in which the retaining openings are disposed on the shipping frame and the retaining protrusions on the foundation, is preferable.

The shipping frame may have a pan which surrounds the counterpiece, such that operating fluids which in the event of a leakage may leak from the crane can accumulate in the pan. In one advantageous embodiment, the pan extends across that region of the shipping frame that is enclosed between the retaining openings. Stiffeners, which serve in stabilizing the shipping frame, may be configured within the pan. The counterpiece for the connector flange of the crane may also be disposed in the region of the pan. The pan may be provided with a lockable drain opening through which the fluids which have accumulated in the pan can be drained.

Moreover, the shipping frame may have a rack face which is disposed beside the pan. Accessories may be deposited on the rack face. Preferably, the rack face is designed such that liquid will run down. In this case, the system in the shipping state may be stored outside, without the accessories being damaged by collecting rain water. In the shipping state, the outrigger of the crane is preferably oriented toward the rack face.

The rack face may have further retaining openings which together with two retaining openings of the second connection mechanism enclose a rectangle. The rectangle may correspond to standard dimensions, such that the shipping frame may readily be fastened onto a trailer having standardized retaining protrusions.

Moreover, a cover frame may be provided for the shipping frame, which cover frame in the shipping state encases the contour of the crane. This means that no elements of the crane protrude upwards beyond the cover frame. Preferably only the outrigger of the crane, which has been placed in a substantially horizontal position, protrudes laterally beyond the cover frame. Moreover, the rack face of the shipping frame may protrude beyond the contour encased by the cover frame. By way of the cover frame it is possible for a plurality of shipping frames which are in the shipping state to be stacked on top of one another. In the stacked state, the upper shipping frame bears on the cover frame of the lower shipping frame. Cover frames of various heights may be provided for shipping or for storing various types of cranes, respectively, in order for the space requirement to be optimized. The system according to the invention thus may comprise a set of a plurality of cover frames, wherein the cover frames have various dimensions in terms of height.

Since the cover frame would be an obstacle during testing of the crane, the cover frame preferably is releasably connected to the structure of the shipping frame. As in the case of the second connection mechanism, connecting may be performed by way of retaining openings and matching retaining protrusions. Preferably, the retaining protrusions are configured on the cover frame and the retaining openings on the structure of the shipping frame. In order for stacked shipping frames to be connected, further retaining protrusions, which are disposed such that they can be locked by way of the retaining openings of the second connection mechanism of the upper shipping frame, may be provided at the upper end of the cover frame. The retaining protrusions are an example of a connection element in the context of the invention.

Moreover, the invention relates to a method for transporting and testing a crane which is intended for use in an offshore wind turbine. In the method, a crane is connected to a shipping frame. In this shipping state, the unit consisting of the crane and the shipping frame may be shipped to a foundation. In order for the crane to be tested, the shipping frame is connected to the foundation. In this state, a load test is performed with the crane.

In the method, the crane is preferably taken to a setup site in individual parts. The crane is assembled and connected to the shipping frame at the setup site. It is irrelevant here whether the crane is first completely assembled and then connected to the shipping frame, or whether individual parts of the crane are already connected to the shipping frame during assembly. Once the crane has been assembled and connected to the shipping frame, the crane has a stable footing as long as it is without a load. Storing or shipping is thus possible.

The setup site is preferably chosen such that no public roads have to be used any more for shipment to the wind turbine. On account of the size of the crane, an abnormal load would have to be moved on public roads. Moreover, on account of the operating fluids which are contained in the crane, this would be a shipment of dangerous goods. Setting-up may be performed in the area of a port, for example, such that the unit consisting of crane and shipping frame may be directly loaded onto a ship.

Prior to being shipped onward, the crane is tested, with functional tests and load tests and/or overload tests being performed. For this purpose, the shipping frame is connected to a foundation which is conceived such that that it can absorb the loads which arise during testing. Should the crane be faulty, the fault can be repaired at the setup site in a substantially simpler manner than in the offshore environment of the wind turbine.

Once the tests have been successfully completed, storing may take place. The system remains in the shipping state during storage, in that the crane is footed on the shipping frame. If the shipping frame is provided with a cover frame which encases the contour of the crane, a plurality of shipping frames which are in the shipping state may be stacked. For subsequent shipment to the wind turbine, the unit consisting of crane and shipping frame is loaded. At the wind turbine, the crane is released from the shipping frame and attached to a working platform of the wind turbine. Following a final functional check, the crane may be commissioned.

After the crane has been released from the shipping frame a plurality of shipping frames may be stacked in a space-saving manner. Preferably, the cover frame is released from the shipping frame prior to being stacked.

The method may be refined using further features which are described with reference to the system according to the invention.

BRIEF DESCRIPTION OF THE DRAWINGS

The invention will be described in an exemplary manner hereunder with reference to the appended drawings by means of advantageous embodiments. In the drawings.

DETAILED DESCRIPTION

Figure 7:
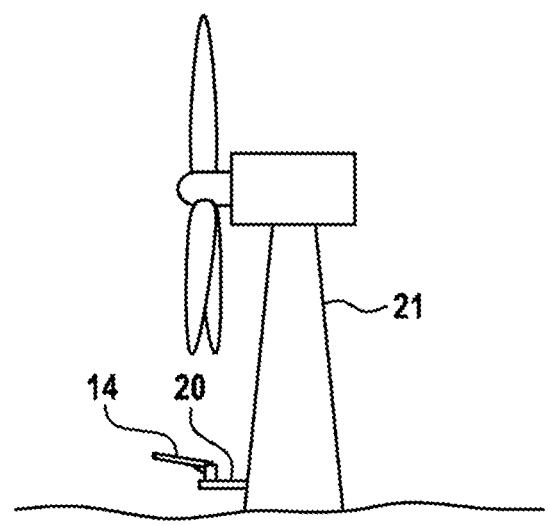
FIG. 7 shows an offshore wind turbine having a crane.

According to FIG. 7, a crane 14 is intended to be used on a working platform 20 of an offshore wind turbine 21. There, the crane 14 serves for picking up comparatively small loads up to a weight of a few tons, for example, from a ship and for lifting them onto the working platform.

The crane 14 which is provided with an outrigger 37 exceeds the dimensions which are permissible for normal road haulage, on account of which the crane 14 usually is not assembled in the factory but is delivered in individual parts. Since unfavorable conditions for assembling the crane 14 prevail at the offshore wind turbine 21, it is provided in the invention for the crane 14 to be assembled from the individual parts at a setup site which is remote from the wind turbine 21. The setup site is preferably chosen such that no further shipment is required by way of public roads between the setup site and the wind turbine 21. The setup site may be in a port area, for example, such that the completely assembled crane 14 may be directly loaded onto a ship by way of which it is shipped to the offshore wind turbine 21.

The crane 14 is constructed such that it has to be anchored by way of a connector flange 22, in order for the crane to be footed in an upright manner. In order for the crane 14 to be held in the upright state during assembly and shipping, a shipping frame 15 is provided. The shipping frame 15 has a counterpiece 23 which matches the connector flange 22 of the crane 14. The connector flange 22 is fastened to the counterpiece 22 by way of a plurality of stud bolts distributed across the circumference (not illustrated). Together, the connector flange 22 and the counterpiece 23 form a first connection mechanism 22, 23 in the context of the invention.

Figure 2:
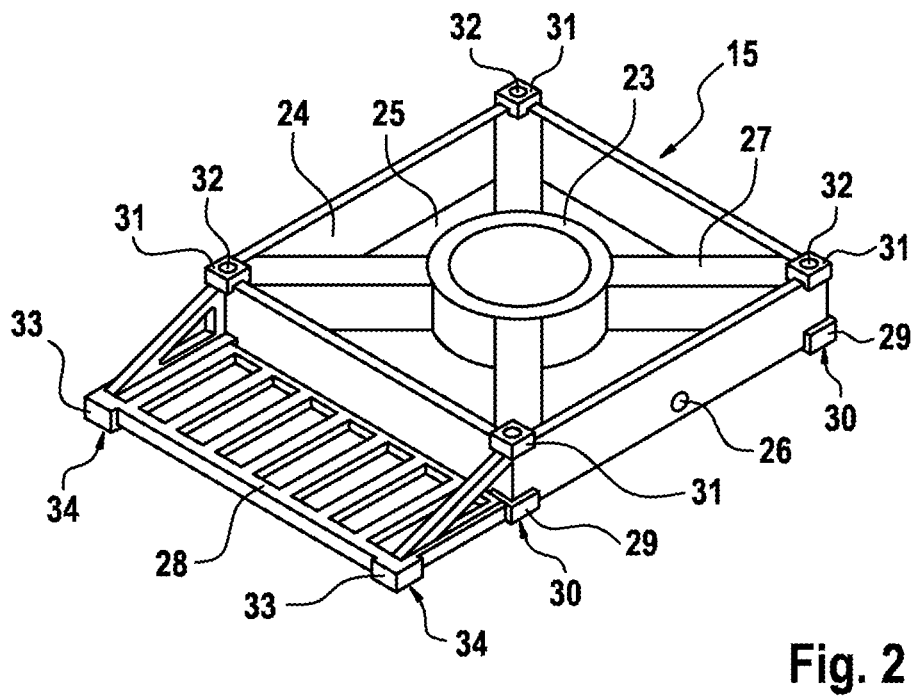
FIG. 2 shows a plan view of a shipping frame.
Figure 6:
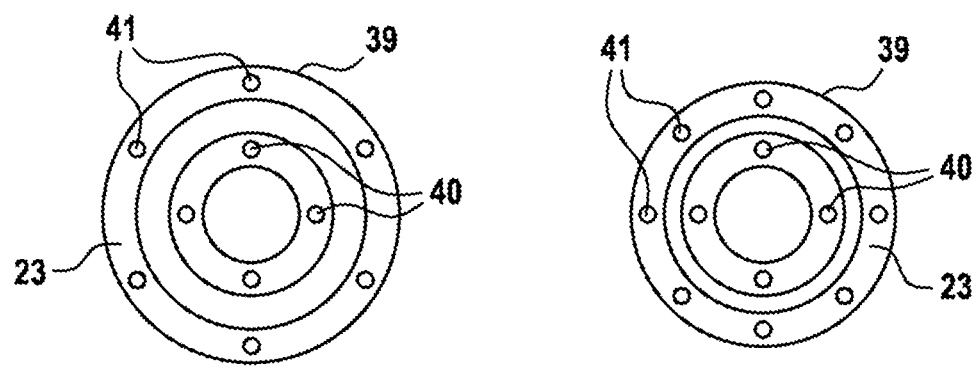
FIGS. 6A and 6B show a set of two adaptor plates.

In the example of FIG. 2, the counterpiece 23 is exactly adapted to the connector flange 22 of the crane 14. The counterpiece 23 may thus not be used with other types of cranes in which the connector flange is of different design. In order for the shipping frame 15 to be able to be used with other types of cranes, adaptor plates 39 such as shown in FIG. 6 may be provided. The adaptor plates 39 have an inner annulus of bores 40, which is configured so as to be congruent in both adaptor plates 39. The adaptor plate 39 may be connected to the shipping frame 15 by way of the bores 40. The outer annulus of bores 41 forms the counterpiece 23 by way of which the connection to the connector flange 22 of the crane 14 is established. In the case of the adaptor plate 39 which is illustrated on the left (image A), the counterpiece 23 has a larger annulus diameter having six bores 41. In the left image B, the counterpiece 23 has a smaller annulus diameter and eight bores 41. By way of a selection of a suitable adaptor plate 39, various types of cranes may be connected to the shipping frame 15.

According to FIG. 2, the shipping frame 15 has a square basic shape, an upright side wall 24 in each case extending between adjacent corners. The area which is enclosed between the side walls 24 is downwardly closed off by a base 25. The pan which is formed by the side walls 24 and the base 25 is tight, such that fluids are retained in the pan. The pan 24, 25 is provided with a discharge opening 26 through which the fluids can be discharged.

A stiffening 27 for stabilizing the counterpiece 23 extends from each corner to the counterpiece 23. A rack face 28 which has a perforated base adjoins one of the side walls 24. Accessories may be stored on the rack face 28.

The shipping frame 15 is equipped with four fittings 29 which are disposed on the lower corners of the shipping frame 15. The fittings 29 are equipped with retaining openings 30 which point downward and which are not visible in FIG. 2. The fittings 29 correspond to the fittings of standard maritime shipping containers.

The shipping frame 15 at the four upper corners thereof has four correspondingly shaped fittings 31 which are provided with retaining openings 32. Two further fittings 33 having retaining openings 34 which point downward are disposed on the two external corners of the rack face 28. The fittings 33 of the rack face 28 may be used for fastening the shipping frame 15 during shipment on a ship or a trailer.

Figure 3:
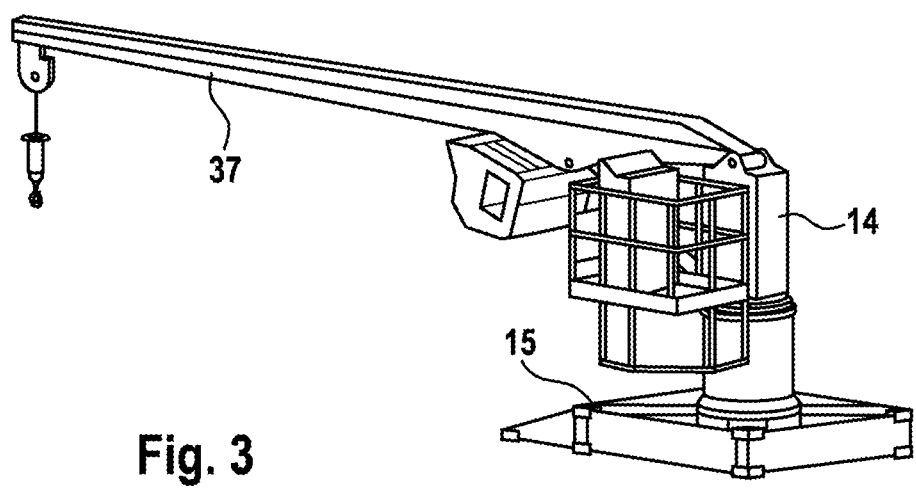
FIG. 3 shows a unit consisting of a crane and a shipping frame in the shipping state.

After the crane 14 has been assembled from the individual parts, the crane 14 together with the shipping frame 15 forms a unit such as that illustrated in FIG. 3. The unit is in the shipping state. The crane 14 is footed upright in a stable manner, and the outrigger 37 is oriented toward the rack face 28. If and when the crane 14 is footed in an upright position, the operating fluids remain in the crane 14. The crane 14 may be switched off and stored. If operating fluids do leak after leakage has occurred in the crane 14, said operating fluids accumulate in the pan 24, 25 of the shipping frame 15. Environmental damage caused by the operating fluids is rendered impossible.

Figure 5:
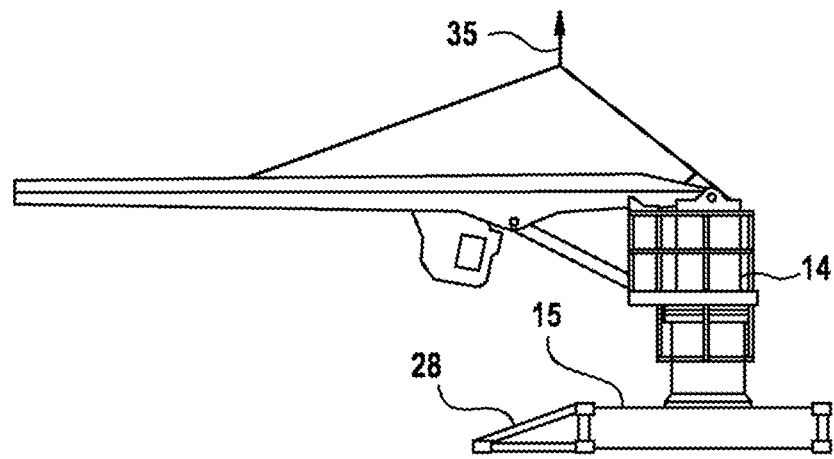
FIG. 5 shows the unit of FIG. 3 in a further state.

In order for the shipping frame 15 having the crane 14 to be loaded or to be moved to another site, a lifting crane (not illustrated), which in FIG. 5 is indicated by the reference sign 35, is required.

Figure 4:
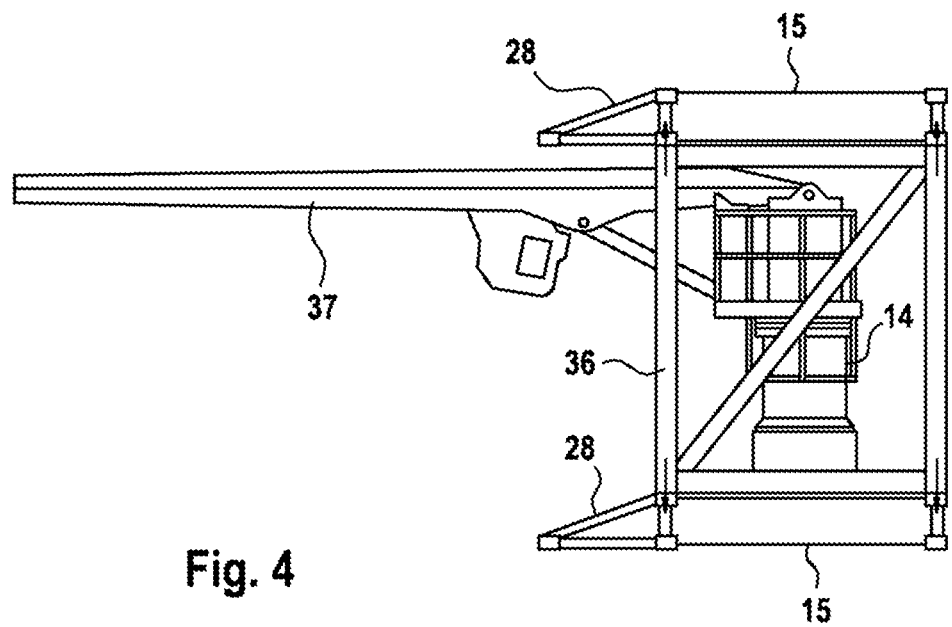
FIG. 4 shows the unit of FIG. 3 in another state.

Moreover, according to FIG. 4, a cover frame 36 for the shipping frame 15 is provided. The cover frame 36 on the lower four corners thereof is equipped with retaining protrusions (not visible) which engage in the retaining openings 32 of the fittings 31 of the shipping frame 15, so as to connect the cover frame 36 to the shipping frame 15. The cover frame 36 is dimensioned such that it encases the contour of the crane 14. Only the outrigger 37 of the crane 14 protrudes laterally beyond the cover frame 36.

The cover frame 36 at the upper four corners thereof is provided with retaining protrusions which point up and which are likewise not visible in FIG. 4. If and when a second shipping frame 15 is placed onto the cover frame 36 from above, the retaining protrusions engage in the retaining openings 30 of the fittings 29 of the second shipping frame 15. The second shipping frame 15 is then fixedly connected to the cover frame 36. A plurality of shipping frames 15 having the crane 14 may be stacked on top of one another in this way. This saves space during intermediate storage of the cranes 14 in the port area and/or during maritime shipment to the offshore wind turbine 21.

Figure 1:
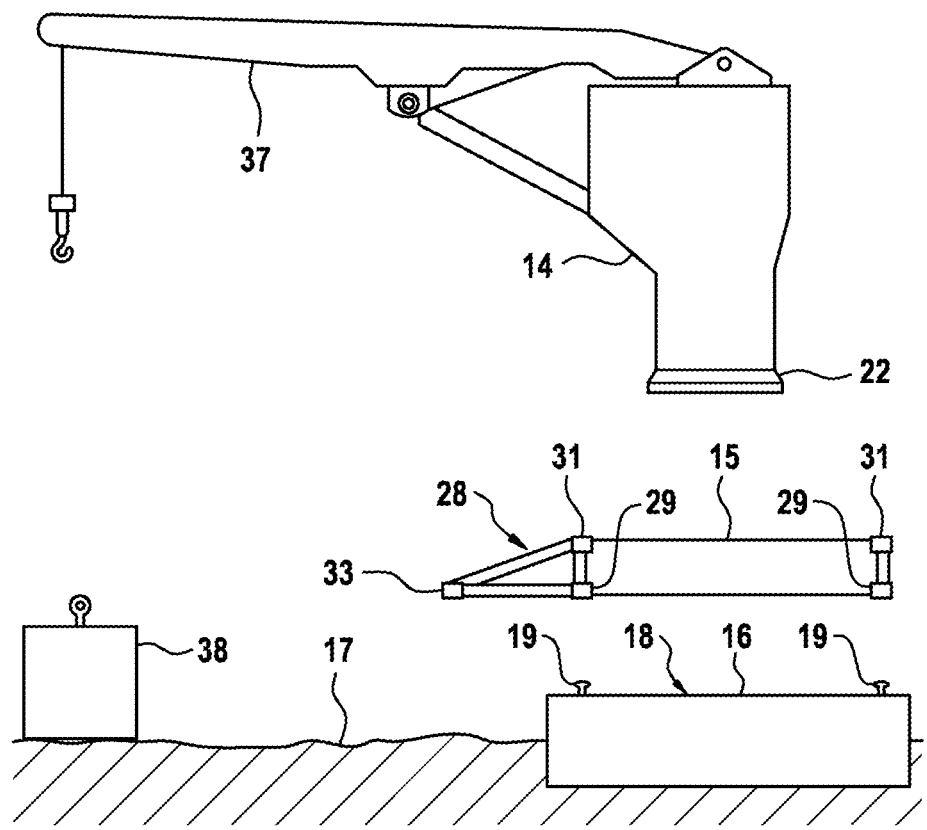
FIG. 1 shows a schematic illustration of a system according to the invention.

The shipping frame 15 is dimensioned such that the crane 14 is footed in a stable upright manner, as long as it is without load. Functional tests in which the outrigger 37 is loaded are not possible when the crane 14 is footed on the shipping frame 15. In order for load tests and overload tests to be nevertheless performed with the crane 14, the system according to the invention, apart from the crane 14 and the shipping frame 15, comprises a foundation 16 which is illustrated in FIG. 1.

The foundation 16 is fixedly anchored in the ground 17. In a plan view, the foundation 16 is square. The foundation 16 on the upper side thereof has a planar face 18. The foundation 16 comprises four retaining protrusions 19 which are disposed so as to be close to the four corners of the foundation and protrude upward in relation to the face 18.

The spacing between the retaining protrusions 19 corresponds to the spacing of the fittings 29 of the shipping frame 15.

If and when the shipping frame 15 is placed onto the foundation 16 from above, the retaining protrusions 19 engage in the retaining openings 30 of the fittings 29 and lock the shipping frame 15 in relation to the foundation 16. The retaining protrusions 19 and the fittings 29 together form a second connection mechanism in the context of the invention.

In this state which in the context of the invention is referred to as the testing state, the crane 14 may be loaded with a load 38, without the crane 14 tilting over. The moment of tilt exerted by the load 38 is transmitted into the foundation 16 by way of the fittings 29 and the retaining protrusions 19. After completion of the load tests and overload tests, the crane 14 having the shipping frame 15 is lifted up. Under the influence of a force which is substantially directed upward, the fittings 29 are automatically released from the retaining protrusions 19.

The invention claimed is:

1. A system for transporting and testing a crane intended for use in an offshore wind turbine, comprising a crane, a shipping frame, and a foundation, said system having a first connection mechanism for establishing a releasable connection between the crane and the shipping frame and a second connection mechanism for establishing a releasable connection between the shipping frame and the foundation, said second connection mechanism comprising a retaining opening and a retaining protrusion which matches the retaining opening, wherein the system is conceived for the following states:
   a. an initial state in which the crane, the shipping frame, and the foundation are provided separate from one another;
   b. a shipping state in which the crane is connected to the shipping frame;
   c. a testing state in which the crane is connected to the shipping frame and the shipping frame is connected to the foundation; and
   wherein in the testing state the retaining protrusion engages behind the retaining opening.

2. The system as claimed in claim 1, wherein the first connection mechanism comprises a connector flange configured on the crane and a counterpiece assigned to the shipping frame.

3. The system as claimed in claim 2, wherein the shipping frame has an adaptor part and the counterpiece is disposed on the adaptor part.

4. The system as claimed in claim 3, comprising a set of adaptor parts, wherein the adaptor parts have various counterpieces for connecting to various types of cranes.

5. The system as claimed in claim 2, wherein the shipping frame has a pan which surrounds the counterpiece.

6. The system as claimed in claim 5, wherein the shipping frame is equipped with a rack face disposed beside the pan.

7. The system as claimed in claim 6, wherein said crane includes an outrigger and the outrigger of the crane in the shipping state is oriented toward the rack face.

8. The system as claimed in claim 1, wherein the second connection mechanism is stable in relation to moments of tilt and the second connection mechanism is released when a force substantially oriented upward acts between the shipping frame and the foundation.

9. The system as claimed in claim 1, wherein a cover frame for the shipping frame is comprised therein and the cover frame in the shipping state encases the contour of the crane.

10. The system as claimed in claim 9, wherein the cover frame at the upper end thereof has a connection element for establishing a connection to a second shipping frame.

11. The system as claimed in claim 9, wherein the cover frame is releasably connected to the shipping frame.

12. A system for transporting and testing a crane intended for use in an offshore wind turbine, comprising a crane including an outrigger, a shipping frame having a pan and a rack face disposed beside the pan, and a foundation, said system having a first connection mechanism for establishing a releasable connection between the crane and the shipping frame and a second connection mechanism for establishing a releasable connection between the shipping frame and the foundation, said first connection mechanism comprising a connector flange configured on the crane and a counterpiece assigned to the shipping frame and surrounded by the pan, wherein the system is conceived for the following states:
   a. an initial state in which the crane, the shipping frame, and the foundation are provided separate from one another;
   b. a shipping state in which the crane is connected to the shipping frame;
   c. a testing state in which the crane is connected to the shipping frame and the shipping frame is connected to the foundation; and
   wherein in the shipping state said outrigger is oriented toward the rack face.

13. A system for transporting and testing a crane intended for use in an offshore wind turbine, comprising a crane, a first shipping frame, a second shipping frame, a cover frame for the first shipping frame having a connection element at an upper end for establishing a connection to the second shipping frame, and a foundation, said system having a first connection mechanism for establishing a releasable connection between the crane and the first shipping frame and a second connection mechanism for establishing a releasable connection between the first shipping frame and the foundation, wherein the system is conceived for the following states:
   a. an initial state in which the crane, the shipping frame, and the foundation are provided separate from one another;
   b. a shipping state in which the crane is connected to the shipping frame;
   c. a testing state in which the crane is connected to the shipping frame and the shipping frame is connected to the foundation; and
   wherein in the shipping state said cover frame encases the contour of the crane.

\* \* \* \* \*